United States Patent
Dewhirst et al.

[11] 3,924,930
[45] Dec. 9, 1975

[54] OPTICAL PARTIAL WAVE PLATE AND METHOD OF FABRICATING AND USING SAME

[75] Inventors: Donald R. Dewhirst, Torrance; Alexander R. Muir, Playa Del Rey, both of Calif.

[73] Assignee: Hughes Aircraft Company, Culver City, Calif.

[22] Filed: Aug. 29, 1974

[21] Appl. No.: 501,522

[52] U.S. Cl................................................ 350/157
[51] Int. Cl.² ......................................... G02B 5/00
[58] Field of Search............................ 350/150, 157

[56] References Cited
UNITED STATES PATENTS
2,607,272   8/1952   Bond.................. 350/157
3,625,592   12/1971  Beasley................ 350/157

*Primary Examiner*—Alfred E. Smith
*Assistant Examiner*—Richard A. Rosenberger
*Attorney, Agent, or Firm*—W. H. MacAllister; Donald C. Keaveney

[57] ABSTRACT

There is disclosed a zero order partial wave plate cut from birefringent crystalline material in a direction such that the optic axis of the material in the plate is inclined at an acute angle to the entrance and exit surfaces of the plate which, for a given desired phase retardation to be produced between quadrature components of polarized light passing orthogonally through the plate, makes the required plate thickness a variable depending on the angle of inclination of the optic axis and on the ordinary and extraordinary indices of refraction of the material. Varying this angle of inclination thus permits the thickness of the plate to be chosen not merely to provide the desired phase retardation, but also to provide convenient fabrication and structural properties such as sufficient thickness in a zero order plate to afford sufficient mechanical strength to permit use of the zero order plate to thereby reduce the temperature dependence of the phase retardation produced by the plate.

16 Claims, 5 Drawing Figures

OPTICAL PARTIAL WAVE PLATE AND METHOD OF FABRICATING AND USING SAME

BACKGROUND OF THE INVENTION

This invention relates to an improved zero order partial wave plate and to a method of fabricating and using the plate to modify the polarization characteristics of a beam of light which may, for example, be the output of an infrared laser. As is pointed out beginning at page 595 of a text book entitled "The Principles of Optics" written by Hardy and Terrin and published in 1932 by the McGraw Hill Book Company, an understanding of the properties of polarized light has historically been arrived at from a consideration of the optical properties of light transmissive crystals which exhibit double refraction or birefringence. Thus, Bartholinus noted in 1699 that a ray of light passing through calcite is divided into two rays which are deviated by different amounts, and one ray is deviated even when the incident ray is normal to the surface of the crystal. In this case the so-called ordinary ray is undeviated, but the extraordinary ray is deviated. Huygens later showed that the principle of wave front construction which he had developed for interpreting the refraction of ordinary rays can be applied to the extraordinary rays if their wavelets are assumed to be ellipsoidal rather than spherical. In a two-dimensional analysis circles represent the wavelets whose envelope is the ordinary wave front and ellipses represent the wavelets whose envelope is the extraordinary wave front. In other words, the ordinary ray travels at the same velocity regardless of its direction within the crystal, whereas the velocity of the extraordinary ray, as represented by the ellipse, depends upon its direction. There is one direction, however, for which the two velocities are equal and this is represented in Huygens' construction by making one axis of the ellipse equal to the diameter of the circular sections of the sphere. This direction is a fixed property of a birefringent material such as calcite and is called the optic axis of the crystal. The optic axis, of course, is a direction and not a line.

It will also be recalled that the velocity of light in any medium except free space depends on both the nature of the medium and the frequency of the light. The ratio of the velocity in free space to that in the medium is termed the refractive index of the medium which is another inherent property of any optical material including birefringent crystals.

In such a crystal the velocity of the ordinary ray is the same as that of the extraordinary ray only along the optic axis. Hence it is only along the optic axis that the refractive indices for the ordinary ray and the extraordinary ray are also the same. The value of the refractive index for the ordinary ray is, of course, independent of the direction of propagation. The refractive index for the extraordinary ray varies, however, from this value to its other extreme value which exists in a direction perpendicular to the optic axis.

Hence, in the prior art when it has been desired to form a partial wave plate such as a quarter wave or half wave plate from a birefringent material, it has been the practice to cut the plate from the birefringent crystalline material in a direction such that the optic axis lies in or parallel to the major plane surfaces of the plate which serve as the entrance and exit windows for light passing orthogonally therethrough. Such an arrangement wherein the optic axis is aligned parallel with the plate surfaces so as to be perpendicular to the direction of propagation of light through the plate maximizes the difference between the index of refraction of the ordinary and extraordinary rays. However, for most birefringent materials such as quartz or sapphire, this maximum difference is such that to make a partial wave plate of zero order, the plate must be so thin as to be mechanically and structurally impractical. Here, the term "zero order wave plate" is used to refer to such a plate for which the phase retardation, $\Delta\lambda_0$, which the plate is designed to introduce between two quadrature components of a beam of polarized light of a given design wavelength, $\lambda_0$, in passing through the plate is less than a full wavelength.

A discussion of current design practice for quarter wave and half wave plates is given beginning at page 41 of a textbook entitled "Introduction to Modern Optics" by Grant R. Fowles which was published in 1968 by Holt, Rinehart and Winston, Inc. It is there shown that for a quarter wave plate designed to produce circularly polarized light by introducing a phase shift of $\pi/2$ between two orthogonal components of linearly polarized light incident on the plate, the plate must have a thickness equal to the design wavelength of the light with which it is to be used divided by four times the difference between the two indices of refraction of the birefringent material. For a half wave plate this divisor is twice the difference between the indices of refraction. More generally, the currently used design formula is $\Delta\lambda_0 = (\eta_o - \eta_e)T$ where $T$ is plate thickness and the other quantities are the indices of refraction and the phase retardation desired.

To cite a particular example, in quartz the indices of refraction of the ordinary and extraordinary rays at 1.06 micron wavelength in the infrared are 1.534 and 1.543 respectively. A zero order half wave plate using quartz would thus need to be 0.0024 inches thick at this wavelength. Such thicknesses are mechanically impractical to realize.

A more general treatment of the concept of polarization and the vectorial nature of light is given in chapter 2 of Fowles and in chapter 29 of Hardy and Perrin. A more general treatment of the optics of solid and crystals is given in chapter 5 of Fowles and in chapter 14 entitled "Optics of Crystals" in a text by Born and Wolf entitled "Principles of Optics" the fourth edition of which was published in 1970 by the Pergamon Press. The general concepts set forth in these texts are assumed herein.

The specific object of the present invention utilizing these known theoretical concepts is to provide a zero order partial wave plate having a thickness such that the plate can be fabricated in practice to necessary tolerances. A wealth of designs exist for partial wave plates generally and of these designs two in particular attempt to accomplish this objective of the present invention. In one such design, the plate is of such a thickness that the phase difference is an integral number of full wavelengths plus the desired partial wave. For example, a half wave plate is of a thickness to produce a 10.5 wavelength phase difference. The disadvantages of this design are that it requires close fabrication tolerances on thickness and that it is temperature sensitive due to the higher order. Expansion and contraction of the plate with temperature in a plate having a thickness such as to produce a 10.5 wavelength phase difference is a considerably larger percentage of one half wavelength than would be the case if the plate were a true zero order plate. Ten wavelengths is about the limit for most materials if operation over a large temperature range is required. By way of example, a 10.5 wavelength quartz plate at room temperature would be 10.37 wavelength at −80° C.

The second prior art design uses two plates of slightly different thickness with the optic axes of the two crossed orthogonally. The phase change produced by the thinner plate subtracts from that of the thicker plate thus producing a net phase difference given by the difference in thickness. This design solves the temperature sensitivity problem but at the expense of greater complexity and cost because it requires two plates, both of which must be fabricated to close tolerances.

SUMMARY OF THE INVENTION

The present invention provides a zero order partial wave plate with the optic axis lying not in the plane of the entrance and exit surfaces of the plate but lying skew to the surfaces. That is to say, the optic axis direction is inclined at a predetermined acute angle, $\theta$, to the normal or perpendicular direction to the major plane surfaces of the plate. This has the effect of reducing the difference between the two indices of refraction rather than maximizing this difference as taught by the prior art. This in turn, as will be shown in detail below, permits one to select a value of thickness, T, of the plate which for a given desired phase retardation, $\Delta\lambda_0$, has a value which not only produces the desired phase retardation but also is large enough to increase the strength of the plate, to make tolerances easier to achieve, and yet to reduce the temperature dependence of the phase retardation produced by the plate since it is a true zero order partial wave plate producing a phase retardation of less than one wavelength.

BRIEF DESCRIPTION OF THE DRAWINGS

These and other objects and advantages of the invention will be apparent from the detailed description below taken in conjunction with the drawings in which like reference characters refer to like parts throughout and wherein.

DETAILED DESCRIPTION OF THE INVENTION

Figure 1:
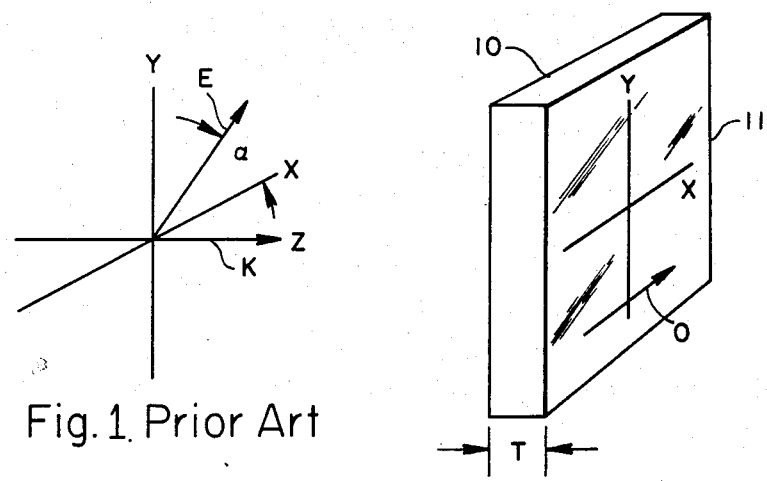
FIG. 1 is a schematic diagram of a partial wave plate fabricated in accordance with the prior art.

In order to more clearly understand the relationship of the present invention to the prior art, the technique of producing circularly and elliptically polarized light from plane polarized light as discussed in the references cited above will first be considered in connection with FIG. 1. In FIG. 1 there is shown a uniaxial birefringent crystal 10 which may, for example, be quartz. The partial wave plate 10 is cut to have two plane parallel opposed major surfaces, one of which is seen at 11 in FIG. 1. Surface 11 serves as the exit window and its opposite surface serves as the entrance window for a beam of plane polarized light, the direction of transmission of which is indicated by the vector K to lie along the Z axis. The partial wave plate 10 has been cut from a piece of birefringent material in such a fashion that the direction of the optic axis (which is indicated by the arrow O) lies in the plane of the major surface or, more generally, is parallel to that surface and perpendicular to the direction of transmission of light through the partial wave plate.

If now the beam of light is polarized in the direction indicated by the vector E which makes an angle $\alpha$ with the X axis and lies in the X-Y plane, then the beam can be represented by its two components (E cosine $\alpha$) and (E sine $\alpha$) vibrating parallel and perpendicular to the optic axis, respectively. The beam of light is incident normally or orthogonally on the entrance window of the waveplate as indicated by the vector K. In the crystal, the components become the extraordinary beam and the ordinary beam. Because the direction of propagation is taken to be normal to the optic axis, both beams traverse the same path in the crystal, but at different velocities. The light emerging from the crystal therefore consists of two beams whose vibrations are parallel and perpendicular to the optic axis (which here is parallel to the X axis). The resultant polarization can readily be found by applying the customary method for compounding two mutually perpendicular vibrations of the same frequency. In the case shown the angle $\alpha$ is 45°, so that the amplitudes of the two components entering the plate are equal. The phase difference introduced in passing through plate depends upon the thickness of the crystal and the difference in velocity for the ordinary and the extraordinary beam. An expression for plate parameters is given at page 42 of the above cited text by Grant R. Fowles for the case where the plate is a quarter wave plate which is made such by choosing its thickness to be such as to introduce a phase difference equal to one quarter wavelength of light being transmitted through the plate. Such a phase difference in the arrangement shown produces circularly polarized light. When the plane of polarization of the incident light is other than at + or −45°, the emergent beam is elliptically polarized. A crystal for which the path difference is one half wavelength rather than one quarter produces plane polarized light having an azimuth angle of −$\alpha$, whatever the azimuth angle $\alpha$ of the incident plane polarized wave may be. A crystal whose thickness is such that it produces a path difference equal to a full wavelength or any integral number of wavelengths does not cause the emergent vibration to differ in any manner from the incident vibration. More generally, in order to produce a phase difference between the two components of an incident plane polarized beam of light which phase difference is to be equal to 1/nth of a wavelength, it is necessary in the prior art arrangement shown in FIG. 1 to make the thickness, T, of the partial wave plate such that the phase retardation to be introduced is equal to the product of the plate thickness times the difference between the index of refraction for the ordinary ray and the index of refraction for the extraordinary ray. That is to say, $\Delta\lambda_0 = \lambda_0/n = (\eta_o - \eta_e)T$.

Figure 2:
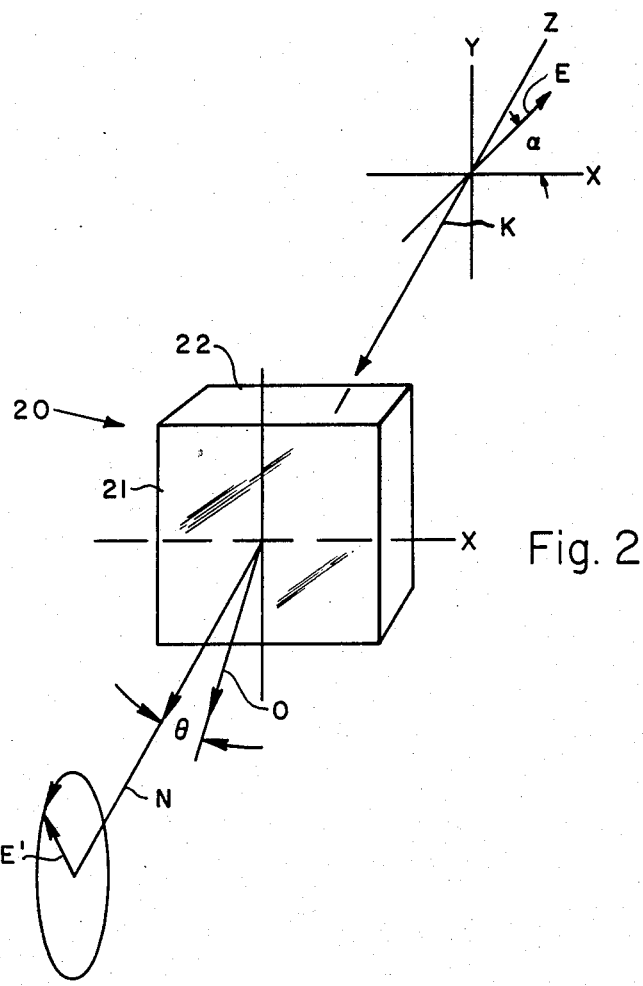
FIG. 2 is a similar schematic diagram of a partial wave plate fabricated in accordance with the present invention.

In FIG. 2 there is shown a sapphire partial wave plate 20 having a major plane surface 21 which forms an exit window for the plate, which has been cut in accordance with the present invention from birefringent sapphire material in such a fashion that the optic axis O makes an angle $\theta$ with the normal, N, to the major plane surfaces of the plate 20 and lies in the X-Z plane. The plane polarized beam of light having a propagation vector K lying along the Z axis and a plane of polarization indicated by the vector E, making an angle $\alpha$ of 45° with the X axis in the XY plane is incident on the entrance window of the plate 20. In accordance with the present invention, however, the angle of inclination $\theta$ which the optic axis makes with the normal to the major surfaces of the plate is varied from the 90° value taught by the prior art in order to permit selection of an optimum value for the thickness, T, of the plate for a given required phase retardation. The derivation of the relationship between $\theta$ and T which makes this possible is explained in conjunction with FIGS. 3 and 4 below.

It will be recalled that the term "optic axis" is used herein to mean that direction in the crystalline birefringent material for which there is only one velocity of propagation independent of the direction of polarization. For uniaxial crystals such as quartz and sapphire, there is only one optic axis direction. For biaxial crystal, there are two such directions.

For propagation which is not along an optic axis, the velocity of propagation is dependent on the polarization and there are two velocities — one for the ordinary wave and another for the extraordinary wave. The ordinary wave is defined as that component of the incident light beam which is polarized perpendicularly to the principle plane. The principle plane in turn, is defined as that plane which is parallel to both the direction of propagation and the direction of the optic axis. The extraordinary wave is that component of the incident light beam which is polarized parallel to the principle plane. The velocity of propagation of the ordinary wave is independent of the direction of propagation and hence, in graphical representation results in a spherical wave normal surface. For the extraordinary wave, the velocity of propagation is a function of the angle between the optic axis and the direction of propagation and the wave normal surface is in general, an ovaloid, which is a surface of revolution of the fourth order. For a uniaxial crystal, the ovaloid is an ellipse of revolution about either the major or minor axis with the axis of rotation parallel to the optic axis. For a more rigorous mathematical discussion of these concepts, reference is made to Section 5.7, "Propagation of Light in Crystals" of the above cited textbook by Fowles. Attention is particularly directed to FIG. 5.8 on page 172, and FIG. 5.12 on page 179.

Figure 3:
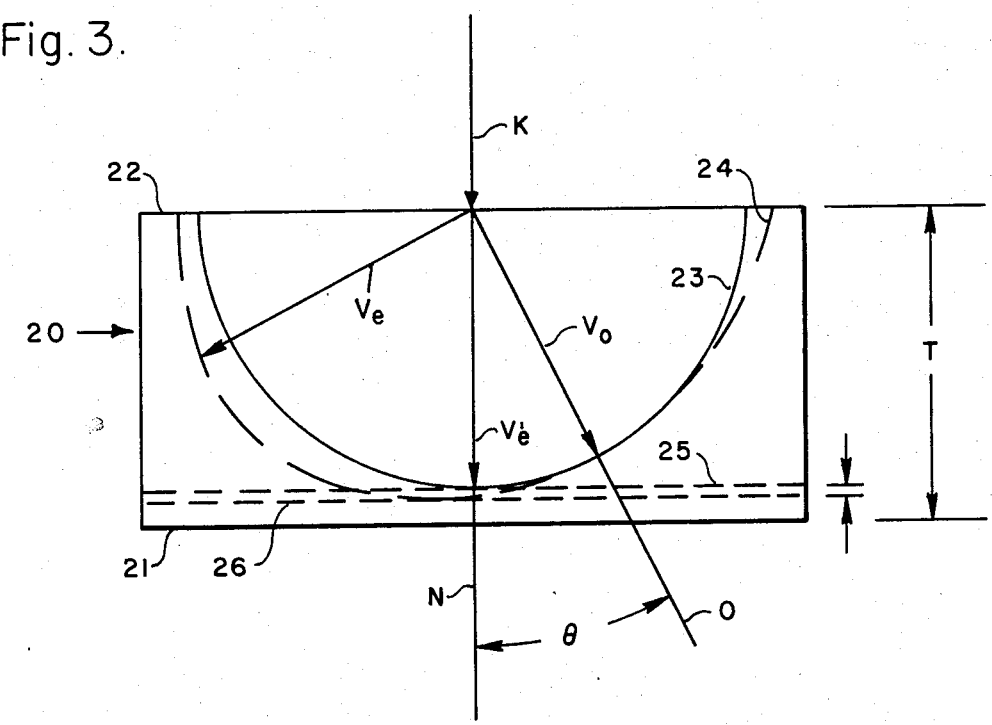
FIG. 3 is a section of the waveplate of FIG. 2 taken in the X-Z plane and including a wavefront construction diagram.

In FIG. 3 there is shown a two-dimensional section of the diagram of the wave normal surfaces for a crystal which has been dimensioned and fabricated in accordance with the present invention. FIG. 3 may be regarded as a section taken through the crystal 20 in the X-Z plane. It will be noted from the drawing that the optic axis O also lies in this X-Z plane which in FIG. 3 is the plane of the paper and that the optic axis is inclined at an angle of inclination, $\theta$, to the entrance surface normal, N. The ordinary ray is that component of the incident light vector, K, which is polarized perpendicularly to the plane of the paper which is, in this case, the principle plane and the extraordinary ray is that component of the incident light vector K, which is polarized parallel to the plane of the paper. The angle of incidence of the light beam represented by the vector K, is normal to the entrance surface 22 and hence, the direction of propagation or wavefront normal for both the ordinary and extraordinary rays makes an angle $\theta$ with the optic axis. It will be noted from a comparison of FIGS. 2 and 3 that the entrance surface 22 is the major plane surface of the crystal which is parallel and opposed to the exit surface 21 shown in FIG. 2. Surface 22 is, of course, not seen in the direction in which FIG. 2 is taken, but the thickness of the crystal, T, is shown in FIG. 3 as being the perpendicular distance between these two plane parallel major surfaces 21 and 22 of the crystal 20.

The normal surface 23 for the ordinary wave is three-dimensionally a sphere of radius $V_0$. The two-dimensional section in FIG. 3 shows a circular section of this sphere 23. The normal surface 24 for the extraordinary wave is three-dimensionally an ellipse of revolution about the minor axis with semi-major axis $V_e$ and semi-minor axis $V_0$. The two-dimensional section shown in FIG. 3 is, of course, such an ellipse. The axis of revolution of the three-dimensional surface is parallel to the optic axis. FIG. 3 shows a cross-section of these three-dimensional surfaces through the center of the wave normal surfaces and parallel to the principle plane.

The wavefront 25 for the ordinary ray is the plane which is parallel to the entrance surface and tangent to the ordinary ray normal surface. The wavefront 26 for the extraordinary ray is the plane which is parallel to the entrance surface 22 and tangent to the extraordinary wave normal surface. The velocity of propagation of the ordinary ray wavefront is indicated by the symbol $V_0$ and the velocity of propagation of the extraordinary ray wave front for the angle of incidence shown, wherein K is normal to the entrance surface 22, is indicated by the symbol $V_e'$. The velocity of propagation of the extraordinary ray wavefront for a direction of propagation perpendicular to the optic axis O is indicated by the symbol $V_e$ and its associated vector. Since the index of refraction of a material is by definition equal to the ratio of the velocity of propagation of light of a given wavelength, $\lambda_0$, in free space to the velocity of propagation of the same light in the given medium, it follows that for anisotropic material such as birefringent crystals, wherein the velocity of propagation varies with variation of direction of propagation in the material, the index of refraction will vary proportionately. Thus, each of the above discussed velocities has an associated index of refraction. That is to say, the index of refraction, $\eta_0$, is the index for the ordinary ray; the index of refraction $\eta_e'$ is the index for the extraordinary ray for a direction of propagation normal to the entrance surface; the index of refraction, $\eta_e'$ is index for a direction of propagation normal to or perpendicular to the optic axis O of the material.

The purpose of the present invention is to fabricate the partial wave plate in a manner such that the plate thickness is large enough to make the plate easy to fabricate and structurally strong. This is accomplished by inclining the optic axis O at an angle $\theta$ to the parallel entrance and exit surfaces 22 and 21, thereby lessening the difference ($\eta_0-\eta_e$) between the index of refraction of the ordinary and extraordinary rays. The prior art teaches that the optic axis should be aligned parallel with the entrance and exit surfaces 22 and 21 of the plate so that the optic axis will be perpendicular to the direction of propagation of the light. Such a construction maximizes the difference between the index of refraction of the ordinary and extraordinary rays rather than lessening it as taught herein. Reducing this value permits one to increase the value of the thickness, T, of the plate in order to obtain a desired phase retardation as will be shown below.

Turning again to FIG. 3, it will be seen that the phase difference between the two wavefronts 25 and 26 of the ordinary and extraordinary rays respectively in passing through the plate of thickness, $T$, is given by the expression $$\Delta\lambda_0 = T(\eta_0 - \eta_e'). \quad (1)$$

This relationship follows from the geometry of the figure and the definitions of the quantities involved given above.

Figure 4:
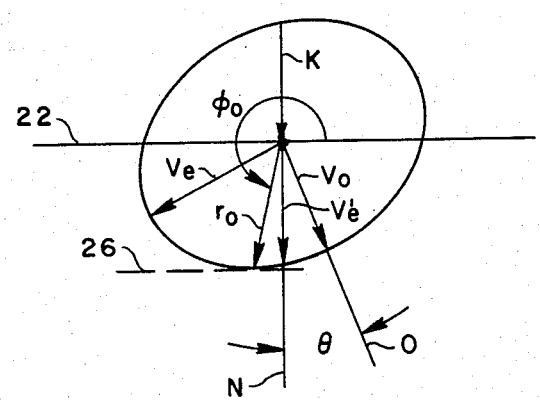
FIG. 4 is an analytic diagram reproducing a portion of FIG. 3 for clarity.

Another expression for the quantity $\eta_e'$ may be derived by using the relationships illustrated in FIG. 4, which reproduces certain of the vector quantities shown in FIG. 3 from the point of view of a set of polar coordinates having their origin at the point at which the vector K of the propagating light beam is incident normally on the entrance surface 22. FIG. 4 shows an ellipse in polar coordinates with the semi-major axis, $V_e$, and the semi-minor axis, $V_0$, and with the major axis rotated counterclockwise by the angle, $\theta$, between the optic axis and the normal to the surfaces. The assumption made is that the eccentricity of this ellipse is small or that $V_e$ is approximately equal to $V_0$ as is the case for practical partial waveplate materials. This assumption simplifies the equation for the ellipse. The parameter of interest is $V_e'$ which is given by the expression $$V_e' = r_0 \sin \phi_0 \quad (2)$$

where $(r_0, \phi_0)$ is the tangent point to the ellipse for the line 26 parallel to the polar axis 22 and tangent to the ellipse.

It is shown in Appendix A at the end of this specification that by using these relationships an expression may be derived for the case shown in FIG. 3, where the optic axis O is inclined at an angle $\theta$ to the normal to the entrance surface which expression gives the relationship between the various indices of refraction for the material and the angle $\theta$ as follows:

$$(\eta_0 - \eta_e')/(\eta_0 - \eta_e) = \sin^2 \phi \quad (3)$$

where the symbols have the definitions given above and illustrated in FIGS. 3 and 4.

Figure 5:
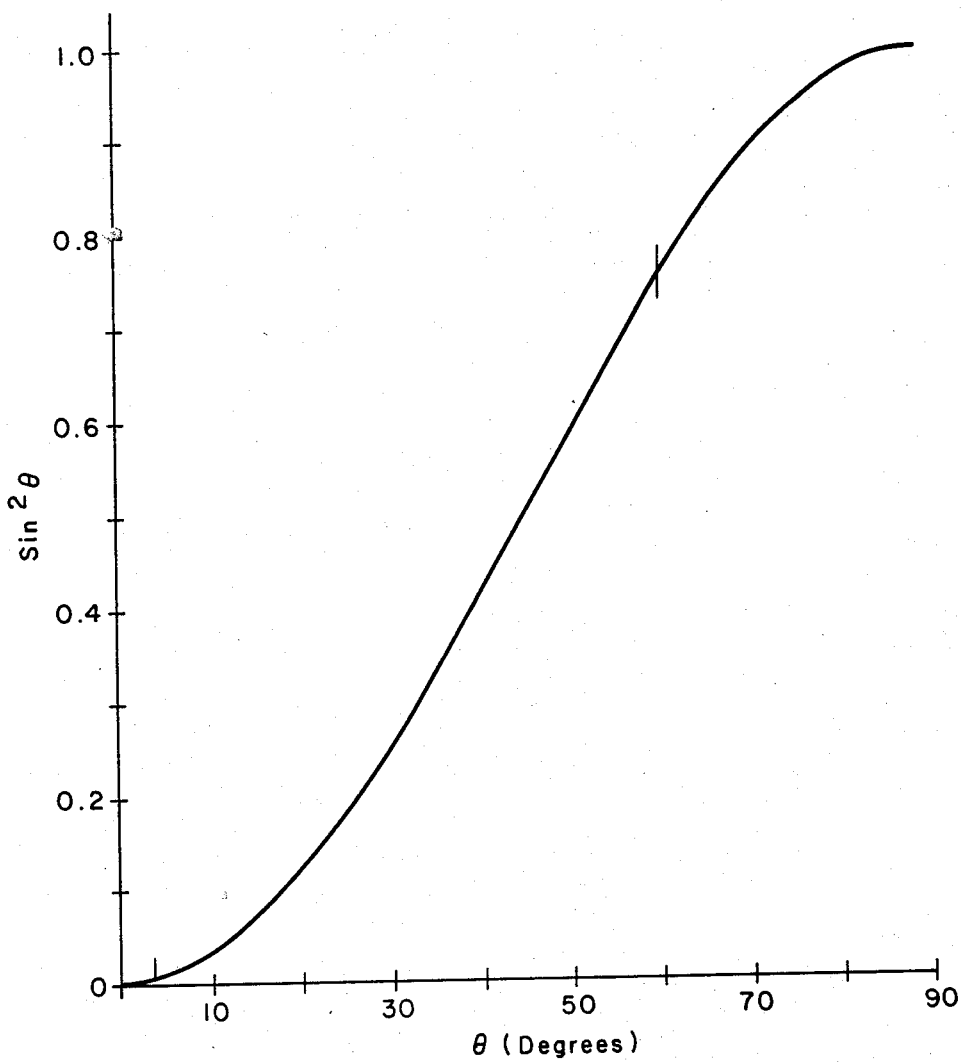
FIG. 5 is a graph of the value of $\sin^2\theta$ shown as a function of $\theta$.

The index of refraction $\eta_e'$ for a direction of propagation normal to the entrance surface 22 can be made to have any value between $\eta_0$ and $\eta_e$ by proper choice of the angle $\theta$ in the range between 0° and 90° theoretically or in practice in the range between 3° and 60°. The expression derived for $\eta_e'$ is valid for material such as quartz and sapphire in which $\eta_0$ and $\eta_e$ differ by less than 1 or 2 percent. A graph of the values of the term $\sin^2 \theta$ as a function of $\theta$ is shown in FIG. 5.

The phase retardation, $\Delta\lambda_0$, for light of a design wavelength, $\lambda_0$, in passing through a plate of thickness, $T$, in a direction normal to the entrance surface is given, as has been noted in the textbook cited above, by the expression $$\Delta\lambda_0 = (\eta_0 - \eta_e')T \quad (4)$$

where, as has been noted, $\eta_e'$ is here used as the index of refraction for a direction of propagation normal to the entrance surface. By substitution from equation (3) set forth above, which has been derived in the manner set forth in detail in Appendix A hereto, it will be seen that expression (4) can be rewritten as $$\Delta\lambda_0 = (\eta_0 - \eta_e) \sin^2 \theta \, T \quad (5)$$

where $\eta_0$ is the index of refraction for the ordinary ray and $\eta_e$ is the index of refraction for the extraordinary ray for a direction of propagation perpendicular to the optic axis. These minimum and maximum values of the index of refraction are the values usually stated by handbooks for most known birefringent materials. By inclining the optic axis at an angle (90°−$\theta$) away from the surface, which angle is the complement of the angle $\theta$ to the normal to the surface, the index of refraction, $\eta_e'$, for the extraordinary ray in a direction that is perpendicular to the direction of the optic axis is altered and made to have a value closer to that of the ordinary ray. In fact, $\eta_e'$ can be made to be any value between $\eta_0$ and $\eta_e$ by proper choice of the angle $\theta$ between 0° and 90°. It follows that the value for the thickness, T, of the plate as set forth in equation (5) above can, for any given predetermined value of phase retardation, be varied to accommodate structural considerations by an appropriate variation in the value of the angle $\theta$. Since the thickness can be adjusted by such variation of the angle of the optic axis in a manner such as to attain a value of thickness producing suitable structural strength with adequate fabrication tolerances, it is not then necessary to introduce phase delays of more than one wavelength or to use more than one plate. That is to say, a partial wave plate of zero order can now be used in instances where the prior art required higher order plates. This, in turn, results in a significant reduction of the temperature dependence of the value of the phase retardation actually introduced by comparison to the design value since the expansion and contraction of the zero order partial wave plate is an expansion and contraction of a plate of the minimum thickness permitted by structural requirements and is therefore the smallest possible percentage of any possible plate, particularly by comparison to plates of higher order.

APPENDIX A

Referring to FIGS. 3 and 4 the relationship between $\Delta\lambda_0$, $\theta$ and $T$ may be derived as follows. The equation of the ellipse in FIG. 4 is $$r^2 = \frac{V_e^2 V_0^2}{V_e^2 \sin^2(\phi-\theta) + V_0^2 \cos^2(\phi-\theta)} \quad (A1)$$

By definition $$\frac{\eta_0}{\eta_e} = \frac{V_e}{V_0} \text{ and } \frac{\eta_0}{\eta_e'} = \frac{V_e'}{V_0} \quad (A2)$$

Assume that $V_e = V_0(1 + \epsilon)$ where $\epsilon$ is small. Then $$\frac{r^2}{V_0^2} = 1 + 2\epsilon \cos^2(\phi-\theta) \text{ and} \quad (A3)$$

$$V_e' = r_0 \sin \phi_0 \quad (A4)$$

Setting $$\frac{d}{d\phi}(r \sin \phi) = 0 \text{ and solving for } r_0 \text{ and } \phi_0,$$

$$\frac{V_e'}{V_0} = 1 + \epsilon \sin^2 \theta, \text{ or} \quad (A5)$$

$$\frac{\eta_0 - \eta_e'}{\eta_0 - \eta_e} = \sin^2 \theta \quad (A6)$$

Hence, $$(\eta_0 - \eta_e') = (\eta_0 - \eta_e) \sin^2 \theta \quad (A7)$$

But from cited textbook theory applied to FIG. 3
$$\Delta\lambda_o = (\eta_o - \eta_e') T \qquad (A8)$$

Substituting (A7) in (A8) gives
$$\Delta\lambda_o = (\eta_o - \eta_e) \sin^2\theta\, T \qquad (A9)$$

which is the relationship between $\Delta\lambda_o$, $\theta$, and $T$ stated in terms of the known extreme values of the indices of refraction of the given material.

What is claimed is:

1. In an optical partial wave plate formed from a birefringent crystalline material having a known optic axis direction and known indices of refraction in a manner such that said plate may be used for introducing a predetermined phase retardation, $\Delta\lambda_o$, between two components of a beam of polarized light of wavelength $\lambda_o$ by passing said beam through said plate in a direction orthogonal to the surfaces of the entrance and exit windows thereof, the improvement comprising:

a. a slab of said birefringent material, said slab having two plane parallel opposed major surfaces the normal to each of which is directed at an acute angle of inclination $\theta$ to said direction of said optic axis in said material;

b. said slab also having a thickness T, measured perpendicularly between said two major surfaces which form said entrance and exit windows for said beam of light, which thickness T has a predetermined relationship to said angle of inclination, $\theta$; and, c. said predetermined relationship between said thickness, T, and said angle of inclination, $\theta$, being given by the expression, $\Delta\lambda_o = (\eta_o - \eta_e) \sin^2\theta\, T$, where $\Delta\lambda_o$ is said predetermined phase retardation, $\eta_o$ is the index of refraction for the ordinary ray in said material, $\eta_e$ is the index of refraction for the extraordinary ray in said material for a direction of propagation perpendicular to said optic axis of said material, $\sin^2\theta$ is the square of the sine of said angle $\theta$ between said optic axis and said normal to said major plane surfaces, and T is said thickness, the value of $\sin^2\theta$ being such as to reduce the produce $(\eta_o - \eta_e) \sin^2\theta$ to permit the thickness T for a given desired value of $\Delta\lambda_o$ to have a value which not only produces the desired phase retardation but also is large enough to increase the strength of the plate.

2. A partial waveplate as in claim 1, wherein the value of said phase retardation is less than 1 wavelength, $\lambda_o$, of the light with which said plate is intended to be used so that said plate is of zero order to reduce the temperature dependence of said phase retardation produced by said plate.

3. A partial waveplate as in claim 1, wherein said wavelength, $\lambda_o$, of the light with which said plate is intended to be used lies in the infrared region of the spectrum.

4. A partial waveplate as in claim 1, wherein the value of said phase retardation is less than 1 wavelength, $\lambda_o$, and wherein said wavelength, $\lambda_o$, lies in the infrared region of the spectrum.

5. A partial waveplate as in claim 1, in which said birefringent material is quartz.

6. A partial waveplate as in claim 1, in which said birefringent material is sapphire.

7. A partial waveplate as in claim 1, wherein said angle $\theta$ has a value lying in the range between 3° and 60°.

8. In the process of introducing a predetermined phase retardation, $\Delta\lambda_o$, between two orthogonal components of a beam of polarized light of wavelength $\lambda_o$ by passing said beam through an optical partial wave plate cut from a birefringent crystalline material having a known optic axis direction and known indices of refraction, said plate being cut to have two plane parallel opposed major surfaces which are positioned in use to be perpendicular to the transmission path of said beam of light to form entrance and exit windows therefor, the improvement comprising:

a. dimensioning said plate during fabrication thereof to have a predetermined thickness, T, where T is the perpendicular distance between said two plane parallel opposed surfaces of said plate; and b. fabricating said plate to incline said optic axis of said birefringent material at an acute angle, $\theta$, to the normal to said major plane surfaces of said plate, the properties of said partial wave plate thereby being predetermined to have a relationship such that said phase retardation, $\Delta\lambda_0$, of light of said wavelength, $\lambda_0$, produced in passing through said plate in said transmission path direction normal to said surfaces forming said exit and entrance windows is equal to the value of said thickness T of the plate times the product of the square of the sine of said angle $\theta$ between said optic axis and said normal to said major plane surface of said plate times the difference between the index of refraction, $\eta_0$, for the ordinary ray in said material and the index of refraction, $\eta_e$, for the extraordinary ray in said material for a direction of propagation perpendicular to said optic axis of said birefringent material, wherein the value of $\theta$ has been determined in accordance with said relationship, $\Delta\lambda_o = (\eta_0 - \eta_e) \sin^2\theta\, T$, by the known values of said indices of refraction of said birefringent material and by the preselected desired values of $\Delta\lambda_o$ and $T$, to permit the thickness, T, for a given desired value of $\Delta\lambda_o$ to have a value which produces the desired phase retardation and also produces desirable structural properties of the plate.

9. A process as in claim 8, wherein the value of said phase retardation is less than one wavelength $\lambda_0$ of the light with which the plate is intended to be used and wherein a single plate of zero order is used to reduce the temperature dependence of said phase retardation, $\Delta\lambda_o$, produced by said plate.

10. A process as in claim 8, wherein said beam of polarized light is the output of a laser.

11. A process as in claim 10, wherein said design wavelength, $\lambda_o$, of the light with which said plate is intended to be used lies in the infrared region of the spectrum.

12. A process as in claim 10, wherein the value of said phase retardation is less than one wavelength, $\lambda_o$, and wherein said wavelength $\lambda_o$ lies in the infrared region of the spectrum.

13. A process as in claim 8, in which said birefringent material is quartz ($SiO_2$).

14. A process as in claim 8, in which said birefringent material is sapphire ($Al_2O_3$).

15. A process as in claim 8, wherein said angle $\theta$ has a value lying in the range between 3° and 60°.

16. A process as in claim 8 wherein said beam of light is the plane polarized output of a laser and has a wavelength, $\lambda_o$, in the infrared region of the spectrum.

* * * * *